United States Patent
Blass

(10) Patent No.: US 7,280,968 B2
(45) Date of Patent: Oct. 9, 2007

(54) SYNTHETICALLY GENERATED SPEECH RESPONSES INCLUDING PROSODIC CHARACTERISTICS OF SPEECH INPUTS

(75) Inventor: Oscar J. Blass, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 10/396,077

(22) Filed: Mar. 25, 2003

(65) Prior Publication Data

US 2004/0193421 A1   Sep. 30, 2004

(51) Int. Cl.
G10L 13/02 (2006.01)

(52) U.S. Cl. .................... 704/266; 704/265
(58) Field of Classification Search ............ 704/4, 704/260, 269
See application file for complete search history.

(56) References Cited

U.S. PATENT DOCUMENTS

| | | | |
|---|---|---|---|
| 5,384,893 A * | 1/1995 | Hutchins | 704/267 |
| 5,396,577 A | 3/1995 | Oikawa et al. | |
| 5,615,300 A * | 3/1997 | Hara et al. | 704/260 |
| 5,806,033 A * | 9/1998 | Lyberg | 704/255 |
| 5,842,167 A * | 11/1998 | Miyatake et al. | 704/260 |
| 5,845,047 A * | 12/1998 | Fukada et al. | 704/268 |
| 5,848,390 A * | 12/1998 | Matsumoto | 704/260 |
| 5,905,972 A * | 5/1999 | Huang et al. | 704/268 |
| 6,081,780 A | 6/2000 | Lumelsky | |
| 6,175,820 B1 | 1/2001 | Dietz | |
| 6,212,501 B1 | 4/2001 | Kaseno | |

FOREIGN PATENT DOCUMENTS

JP    07-182064    7/1995

* cited by examiner

*Primary Examiner*—Michael N Opsasnick
(74) *Attorney, Agent, or Firm*—Akerman Senterfitt

(57) ABSTRACT

A method for digitally generating speech with improved prosodic characteristics can include receiving a speech input, determining at least one prosodic characteristic contained within the speech input, and generating a speech output including the prosodic characteristic within the speech output.

28 Claims, 2 Drawing Sheets

SYNTHETICALLY GENERATED SPEECH RESPONSES INCLUDING PROSODIC CHARACTERISTICS OF SPEECH INPUTS

BACKGROUND OF THE INVENTION

1. Technical Field

The present invention relates to the field of synthetic speech generation.

2. Description of the Related Art

Synthetic speech generation is used in a multitude of situations; a few of which include: interactive voice response (IVR) applications, devices to aid specific handicaps, such as blindness, embedded computing systems, such as vehicle navigation systems, educational systems for automated teaching, and children's electronic toys. In many of these situations, such as IVR applications, customer acceptance and satisfaction of a system is critical.

For example, IVR applications can be designed for customer convenience and to reduce business operating costs by reducing telephone related staffing requirements. In the event that customers are dissatisfied with the IVR system, individual customers will either opt out of the IVR system to speak with a human agent, will become generally disgruntled and factor their dissatisfaction into future purchasing decisions, or simply refuse to utilize the IVR system at all.

One reason many users dislike systems that provide synthetically generated speech is that such speech can sound mechanical or unnatural and can be audibly unpleasant, even difficult to comprehend. Unnatural vocal distortions can be especially prominent when the speech generated relates to proper nouns, such as people, places, and things due to the many exceptions to rules of pronunciation that can exist for these types of words. Prosodic flaws in the synthetically generated speech can cause the speech to sound unnatural.

Prosodic characteristics relate to the rhythmic aspects of language or the suprasegmental phonemes of pitch, stress, rhythm, juncture, nasalization, and voicing. Speech segments can include many discernable prosodic characteristics, such as audible changes in pitch, loudness, and syllable length. Synthetically generated speech can sound unnatural to listeners due to prosodic flaws within the synthetically generated speech, such as the speed, the loudness in context, and the pitch of the generated speech.

SUMMARY OF THE INVENTION

The invention disclosed herein provides a method and a system for generating synthetic speech with prosodic responses with improved prosodic characteristics over conventional synthetic speech. In particular, a speech generation system can extract prosodic characteristics from speech inputs provided by system users. The extracted prosodic characteristics can be applied to synthetically generated speech responses. Prosodic characteristics that can be extracted and applied can include, but are not limited to, the speed before and after each word, the pauses occurring before and after each word, the rhythm of utilized words, the relative tones of each word, and the relative stresses of each word, syllable, or syllable combination. By applying extracted prosodic characteristics, speech generation systems can create synthetic speech that sounds more natural to the user, thereby increasing the understandability of the speech and providing a better overall user experience.

One aspect of the present invention can include a method for synthetically generating speech with improved prosodic characteristics. The method can include receiving a speech input, determining at least one prosodic characteristic contained within the speech input, generating a speech output including the extracted prosodic characteristic. The at least one prosodic characteristic can be selected from the group consisting of the speed before and after a word, the pause before and after a word, the rhyme of words, the relative tones of a word, and the relative stresses applied to a word, a syllable, or a syllable combination. In one embodiment, the receiving step and the generating step can be performed by an interactive voice response system. In another embodiment, the receiving step can occur during a first session and the generating step can occur during a second session. The first session and the second session can represent two different interactive periods for a common user. Upon completing the determining step, the prosodic characteristic can be stored in a data store, and before the generating step, the prosodic characteristic can be retrieved from the data store.

In one embodiment, the speech input can be converted into an input text string and a function can be performed responsive to information contained within the input text string. In a further embodiment, an output text string can be generated responsive to the performed function. The output text string can be converted into the speech output. In another embodiment, the speech output can include a portion of the speech input, wherein this portion of the speech output utilizes the prosodic characteristic of the speech input. In yet another embodiment, a part of speech can be identified, where the part of speech is associated with at least one word within the speech input. The prosodic characteristic can be detected for at least one selected part of speech. This part of speech can be a proper noun.

Another aspect of the present invention can include a system for generating synthetic speech including a speech recognition component capable of extracting prosodic characteristics from speech input. A text-to-speech component capable of modifying at least a portion of synthetically generated speech based upon at least a portion of the prosodic characteristics can also be included. Moreover, a prosodic characteristic store configured to store and permit retrieval of the prosodic characteristics can be included. In one embodiment, the system can be an interactive voice response system.

Another aspect of the present invention can include a system for synthetically generating speech including receiving a speech input, analyzing the speech input to generate special handling instructions, and altering at least one speech generation characteristic of a text-to-speech application based upon the special handling instructions. The special handling instructions can alter output based upon a language proficiency level and/or an emotional state of the listener. The speech generation characteristic can alter the clarity and/or pace of speech output.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for digitally generating speech responses with improved prosodic characteristics. More particularly, the invention can extract prosodic characteristics from a speech input during a speech recognition process. These prosodic characteristics can be applied when generating a subsequent speech output. Particular prosodic characteristics that can be extracted and later applied can include, but are not limited to, the speed before and after each word, the pauses occurring before and after each word, the rhythm of utilized words, the relative tones of each word, and the relative stresses of each word, syllable, or syllable combination.

Figure 1:
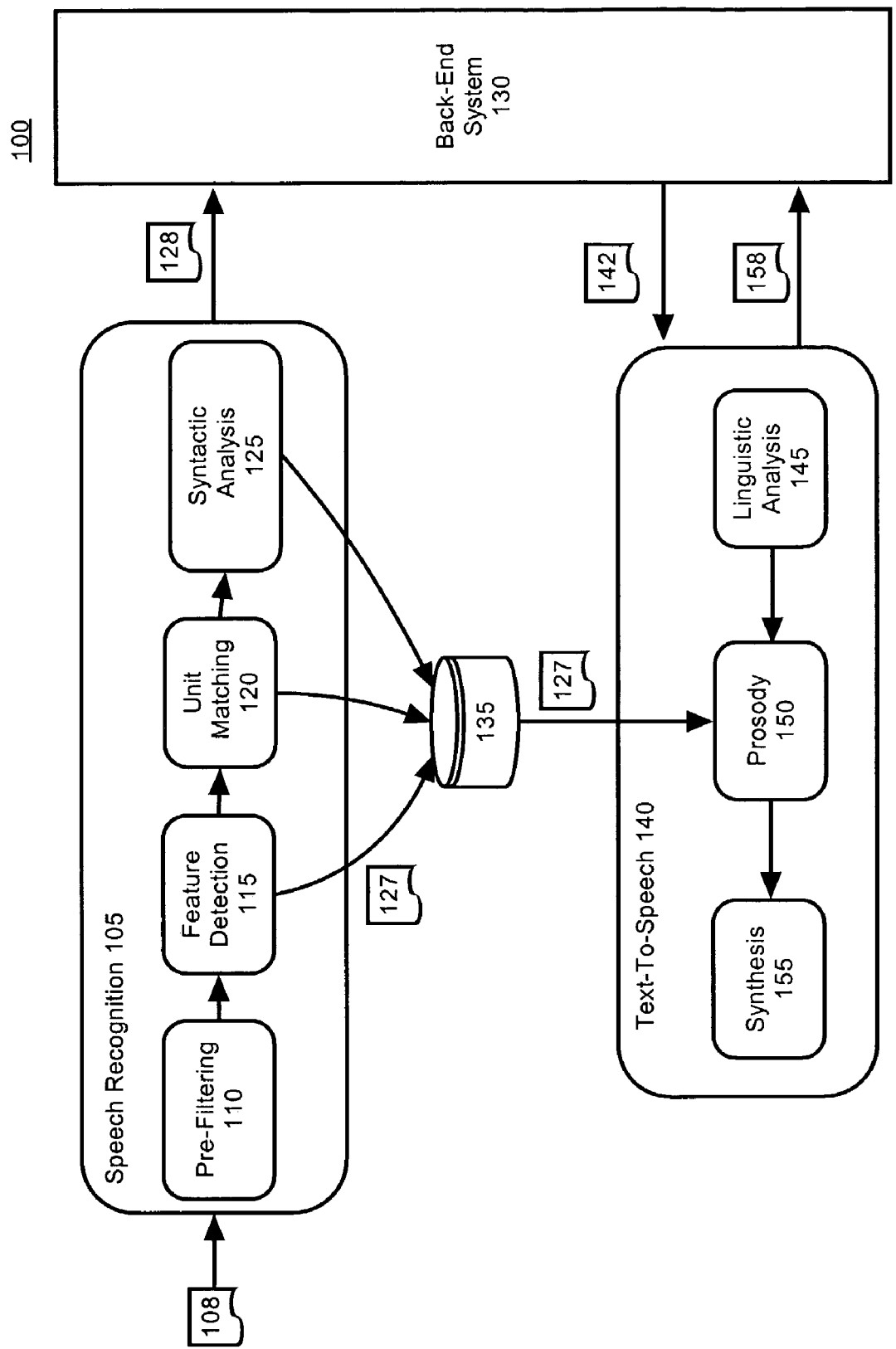
FIG. 1 is a schematic diagram illustrating a speech generation system that can extract and utilize prosodic characteristics from speech inputs in accordance with the inventive arrangements disclosed herein.

FIG. 1 is a schematic diagram illustrating a system 100 that can extract and later apply prosodic characteristics. The system 100 can include a speech recognition application 105, a text-to-speech application 140, a prosodic characteristic store 135, and a back-end system 130.

The speech recognition application 105 can convert a verbal speech input 108 into a representative textual string 128. During this conversion process, the speech recognition application 105 can extract prosodic characteristics 127 from the speech input 108. For example, the speech recognition application 105 can detect and extract durational information pertinent to the pauses that occur before and after words within the speech input 108. Any of a variety of approaches can be utilized by the speech recognition application 105 to perform its functions so long as the selected approach allows prosodic characteristics 127 to be extracted from the speech input 108.

The text-to-speech application 140 can allow the system 100 to convert a textual output to a speech output that can be transmitted to a user. The text-to-speech application 140 can perform text-to-speech conversions in many different manners. For example, the text-to-speech application 140 can utilize a rule based approach where individual phoneme segments can be joined through computer based rules specifying phoneme behavior within the context of the generated speech output 158. Alternately, the text-to-speech application 140 can utilize a concatenative synthesis approach where stored intervals of natural speech are joined together, stretched/compressed, and otherwise altered to satisfy the requirements set by the preceding acoustic-prosodic components. Any approach where stored prosodic characteristics 127 can be incorporated into generated speech can be utilized by the text-to-speech application 140. As used herein, a phoneme can be the smallest phonetic unit in a language that is capable of conveying a distinction in meaning, such as the "m" of "mat" and the "b" of "bat" in the English language.

The prosodic characteristic store 135 can store prosodic characteristics 127, such as those received from the speech recognition application 105, for later retrieval by the text-to-speech application 140. The prosodic characteristic store 135 can utilize a temporary storage location such as random access memory (RAM) to store prosodic characteristics 127 in allocated variable locations. In an alternate example, the prosodic characteristic store 135 can utilize a more permanent storage location, such as a local or networked hard drive or a recordable compact disk (CD), to store the prosodic characteristics 127 for longer time periods.

The back-end system 130 can be system that utilizes a speech recognition application 105 and a text-to-speech application 140 within its operation. For example, the back-end system 130 can be an integrated voice response (IVR) system that accepts speech input 108 from a caller, converts the input to a text string 128, performs an action or series of actions resulting in the generation of a text string 142, which is converted to a speech output 158, and transmitted to the caller. In another embodiment, the back-end system 130 can be a software dictation system, wherein a user's verbal input is converted into text. In such an embodiment, the dictation system can generate speech queries for clarification, wherever the dictation system is uncertain of a portion of the speech input and thereby is unable to generate a transcription.

In operation, a speech input 108, such as a vocal response for an account number, can be received by the speech recognition application 105. A pre-filtering component 110 can be used to remove background noise from the input signal. For example, static from a poor cellular connection or background environmental noise can be filtered by the pre-filtering component 110. A feature detection component 115 can segment the input signal into identifiable phonetic sequences. Multiple possible sequences for each segment can be identified by the feature detection component 115 as possible phonemes for a given input signal.

Once an input has been separated into potential phonetic sequences, the unit matching component 120 can be utilized to select among alternative phonemes. The unit matching component 120 can utilize speaker-independent features as well as speaker dependant ones. For example, the speech recognition application 105 can adapt speaker-independent acoustic models to those of the current speaker according to stored training data. This training data can be disposed within a data store of previously recognized words spoken by a particular speaker that the speech recognition application 105 has "learned" to properly recognize. In one embodiment, the speaker-independent acoustic models for a unit matching component 120 can account for different languages, dialects, and accents by categorizing a speaker according to detected vocal characteristics. The syntactic analysis 125 can further refine the input signal by contextually examining individual phoneme segments and words. This contextual analysis can account for many pronunciation idiosyncrasies, such as homonyms and silent letters. The results of the syntactic analysis 125 can be an input text string 128 that can be interpreted by the back-end system 130.

The back-end system 130 can responsively generate an output text string 142 that is to be ultimately converted into a speech output 158. A linguistic analysis component 145 can translate the output text string 142 from one string of symbols (e.g. orthographic characters) into another string of symbols (e.g. an annotated linguistic analysis set) using a finite state transducer, which can be an abstract machine containing a finite number of states that is capable of such symbol translations. One purpose of the linguistic analysis component 145 is to determine the grammatical structure of the output text string 142 and annotate the text string appropriately. For example, since different types of phrases, such as interrogatory verse declarative phrases, can have different stresses, pitches, and intonation qualities, the linguistic analysis component can detect and account for these differences.

Annotating the output text string 142 within the linguistic analysis 145 component in a manner cognizable by the prosody component 150 allows the text-to-speech application 140 to perform text-to-speech conversions in a modular fashion. Such a modular approach can be useful when constructing flexible, language independent text-to-speech applications. In language independent applications, different linguistic descriptions can be utilized within the linguistic analysis component 145, where each description can correspond to a particular language.

The prosody component 150 can receive an annotated linguistic analysis set (representing a linguistically analyzed text segment) from the linguistic analysis component 145 and incorporate annotations into the string for prosodic characteristics. In annotating the received text segment, the prosodic component 145 can segment received input into smaller phonetic segments. Each of these phonetic segments can be assigned a segment identity, a duration, context information, accent information, and syllable stress values.

The prosody component 150 can also annotate information on how individual phonetic segments are to be joined to one another. The joining of phonetic segments can form the intonation for the speech to be generated that can be described within a fundamental frequency contour (F0). Since human listeners can be sensitive to small changes in alignment of pitch peaks with syllables, this fundamental frequency contour can be very important in generating natural sounding speech.

In one embodiment, the fundamental frequency contour can be generated using time-dependent curves. Such curves can include a phrase curve (which can depend on the type of phrase, e.g., declarative vs. interrogative), accent curves (where each accented syllable followed by non-accented syllables can form a distinct accent curve), and perturbation curves (that can account for various obstruents that occur in human speech). Other embodiments can generate the fundamental frequency contour using the aforementioned curves individually, in combination with one another, and/or in combination with other intonation algorithms.

The prosody component 150 can utilize data from the prosodic characteristic store 135 including both durational and intonation information. For example, if the prosodic characteristic extractor 130 detected and recorded information about the rhythm of words used within the speech input 108, the fundamental frequency contour for the generated text can be modified to more closely coincide with the previously detected rhythm of the speech input 108. Similarly, the relative tones and stresses of words used within the speech input 108 can be emulated by the prosody component 150.

The following example, which assumes that the text-to-speech application 140 is a concatenative text-to-speech application, illustrates how relative tones and stresses within the speech input 108 can be used to alter the speech output 158. A concatenative text-to-speech application can generate speech based upon a set of stored phonemes and/or sub-phonemes. In one configuration, a costing algorithm can be used to determine which of the available phonemes used by the concatenative text-to-speech application is to be selected during speech generation. The costing algorithm can make this determination using various weighed factors, which can include tonal factors and factors for word stress. The prosody component 150 can alter baseline weighted factors based upon the prosodic characteristics 125 extracted from the speech input 108. In another configuration that uses a concatenative text-to-speech application, phoneme and/or sub-phonemes can be extracted from the speech input 108 and added to the pool of phonemes used by the concatenative text-to-speech application. In both configurations, the prosody component 150 can be capable of emulating tonal, stress, and other prosodic characteristics of the speech input 108. It should be appreciated that other output adjustment methods can utilized by the prosody component 150 and the invention is not intended to be limited to the aforementioned adjustment methods.

In one embodiment, the prosody component 150 can apply prosodic characteristics 127 from the prosodic characteristic store 135 only when the prosodic characteristic store 135 contains words matching words in the output text string 142. For example, a customer's name or account number that was contained within the speech input 108 can be included in the output text string 142. In such a situation, the recorded prosodic characteristics 127 for the name or account number can be utilized by the prosody component 150.

In another embodiment, the prosody component 150 can receive more generalized prosodic characteristics 127 from the prosodic characteristic store 135 and utilize these generalized prosodic characteristics 127 regardless of the individual words from the output text string 142 being processed by the prosody component 150. For example, the speed before and after words and the pauses before and after each word of the speech input 108 can form general patterns, such as longer pauses before nouns than articles and quicker pronunciation of verbs than average, that can be emulated by the prosody component 150.

In yet another embodiment, the speech input 108 can be analyzed to determine a speaker's proficiency and/or comfort level in the language being spoken. For example, if the speech input 108 includes "I vuld like to vly to Orrlatdo", the speech recognition application 105 can assign a relatively low language proficiently level to the speaker. This proficiency level can be stored within the prosodic characteristic store 135 and accessed by the text-to-speech application 140. Based upon the language proficiency level, the text-to-speech application 140 can adjust the speech output 158. For example, whenever a speaker has a low language proficiency level, the text-to-speech application 140 can be adjusted to maximize clarity, thereby producing slower, less naturally sounding speech output 158.

The synthesis component 155 can interpret annotated textual data from the prosody component 150 and generate an audible signal that corresponds to the annotated textual data. As the synthesis component 155 is the speech generating component, the annotated data of the prosodic component 150 can be applied when the synthesis component can interpret and convert the annotated output. Accordingly, possible prosodic characteristics 127 can be limited by the approach and algorithms utilized by the synthesis component 155. Nevertheless, any synthesis approach can be utilized within the system 100. For example, the synthesis component 155 can utilize a concatenative approach, a rule based approach, a combined approach that uses both rule based and concatenative synthesis, as well as any other synthesis approach capable of accepting input from the prosody component 150.

Notably, in one embodiment, the speech input 108 or portions thereof can be stored within the prosodic characteristic store 135. The text-to-speech application 140 can then utilize the stored audio when generating synthetic speech. For example, portions of the stored audio can be concatenated with synthetically generated speech segments to ultimately generate the speech output 158.

Figure 2:
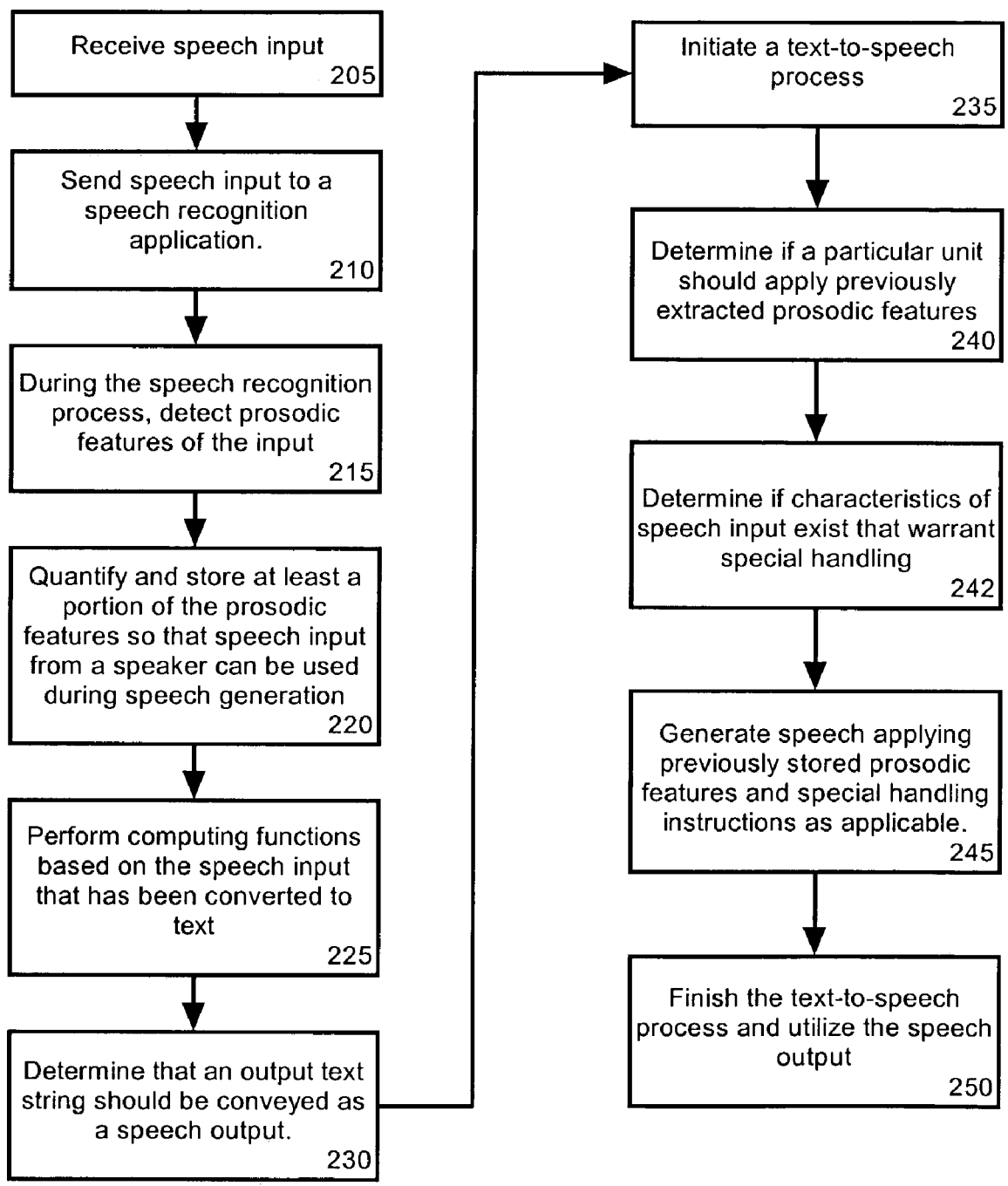
FIG. 2 is a flow chart illustrating a method for extracting and subsequently applying prosodic characteristics using the system of FIG. 1.

FIG. 2 is a flow chart illustrating a method 200 for extracting and subsequently applying prosodic characteristics. The method 200 can be performed in the context of a system that receives a speech input and returns a synthetically generated speech output. The method 200 can begin in step 205 where a speech input is received. The speech input can represent a user response to a posed question, such as a request and accompanying response for a credit card number. In step 210, the speech input can be sent to a speech recognition application.

In step 215, prosodic characteristics of the speech input can be detected. Prosodic characteristics can relate to audible changes in pitch, loudness, and syllable length. Moreover, prosodic characteristics can create a segmentation of a speech chain into groups of syllables. In other words, prosodic characteristics can be used to form groupings of syllables and words into larger groupings. Any prosodic characteristics inherent in speech that can be recorded can be detected during this step. For example, the speed before and after each word, the pauses before and after each word, the rhythm of a group of words, the relative tones of each word, and the stresses of each syllable, syllable combination, or word can be detected. This list of prosodic characteristics is not exhaustive and other prosodic characteristics such as intonation and accent can be detected during this step.

In step 220, detected prosodic characteristics can be quantified and stored so that speech input from a speaker can be used during speech generation. While in one embodiment, prosodic characteristics can be detected and stored for each word within the speech input, other embodiments can record prosodic characteristics for selected words. For instance, in one embodiment, the detection of a proper noun within the speech input can trigger the collection of prosodic characteristics. Notably, proper nouns, such as people, places, and things can be especially difficult to accurately synthesize due to the many exceptions in their pronunciations. In another embodiment, all detected words having more than one syllable can trigger the collection of prosodic characteristics.

In step 225, once the speech recognition process has completed, a back-end system can perform computing functions triggered by a textual input string that results from the speech input. For example, an IVR system can determine whether an input represents a valid customer account number or not. In step 230, the back-end system can generate an output text string and determine that this string should be conveyed to a user as speech. For example, an, IVR system can generate a confirmation response to confirm a users last input, such as a textual question, "You entered XYZ for your account number, is this correct?"

In step 235, the back-end system can initiate a text-to-speech process for the output text string. In step 240, the text-to-speech application can determine if the output text string should utilize previously extracted prosodic characteristics. Prosodic characteristics can be used for words that were within the speech input and are being repeated within the output and/or can be more generally extrapolated from the input and applied to newly generated words within the output. For example, one embodiment can choose to utilize stored prosodic characteristics only if the speech input contained a previously stored proper noun and that proper noun is repeated in the speech output. In another embodiment, the text-to-speech application can utilize user specific prosodic characteristics for the entire generated speech output.

In step 242, characteristics of the speech input can be examined to determine if special handling is warranted. For example, the speech input can indicate the relative language proficiency level of the speaker. If a speaker's input indicates a low language proficiency level, then output can be adjusted to maximize clarity, which may decrease the pace of generated speech. In another example, the speech input can indicate that a speaker is in a heightened emotional state, such as frantic or angry. If a speaker is frantic, then the pace of the generated speech can be increased. If the speaker is angry, then the text-to-speech application can be adjusted to generate speech that is conciliatory or soothing.

In step 245, the text-to-speech application can utilize the previously stored prosodic characteristics when generating speech output. The method 200 either can integrate the stored prosodic characteristics as part of the normal generation of prosodic characteristics for the output, or the method 200 can perform an additional routine that enhances already generated prosodic characteristics. Accordingly, in one embodiment, the method can be implemented as a plug-in component that can be capable of operating with existing text-to-speech applications. In step 250, the text-to-speech process can result in a speech output that can be conveyed as a digital signal to a desired location or audibly played for a user of the method.

It should be noted that within method 200, prosodic characteristics can be stored temporarily for a particular session and/or can be stored for significant periods of time. Accordingly, the text-to-speech application can utilize archived prosodic characteristics recorded during interactive user sessions other than the present one. For example, a user can initiate a first session in which his or her name is received by an IVR system and prosodic characteristics for the name stored. In a second session with the IVR system, the stored prosodic characteristics for the name can be utilized. For instance, when the user enters an account number in the second session, the IVR system can provide a response, such as "Is this Mr. Smith calling about account 321?" where previously stored prosodic characteristics for Mr. Smith's name can be used to generate the speech output.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for synthetically generating speech with improved prosodic characteristics comprising the steps of:

storing at least one pre-defined prosodic characteristic;

receiving a speech input;

extracting at least one prosodic characteristic contained within said speech input;

selecting at least one prosodic characteristic for generating a speech output, wherein said at least one prosodic characteristic is selected from said at least one extracted prosodic characteristic and said at least one pre-defined prosodic characteristic, wherein said at least one pre-defined prosodic characteristic is selected if said at least one extracted prosodic characteristic matches at least one condition; and, generating a speech output including said at least one selected prosodic characteristic within said speech output.

2. The method of claim 1, wherein said speech output includes a portion of said speech input, wherein said portion of said speech output utilizes said at least one prosodic characteristic.

3. The method of claim 1, further comprising the steps of:
upon completing said determining step, storing said prosodic characteristic into a data store; and,
before said generating step, retrieving said prosodic characteristic from said data store.

4. The method of claim 1, wherein said receiving step occurs during a first session and wherein said generating step occurs during a second session, and wherein said first session and said second session represent two different interactive periods for a common user.

5. The method of claim 1, wherein at least one prosodic characteristic is selected from the group consisting of the speed before and after a word, the pause before and after a word, the rhyme of words, the relative tones of a word, the relative stresses applied to a word, the relative stresses applied to a syllable, and the relative stresses applied to a syllable combination.

6. The method of claim 1, wherein said receiving step and said generating step are performed by an interactive voice response system.

7. The method of claim 1, further comprising the steps of:
converting said speech input into an input text string; and,
performing a function responsive to said converting step.

8. The method of claim 7, further comprising the steps of:
generating an output text string responsive to said performing step; and,
converting said output text string into said speech output.

9. The method of claim 1, further comprising the steps of:
identifying a part of speech associated with at least one word within said speech input; and,
detecting said at least one prosodic characteristic for said selected part of speech.

10. The method of claim 9, wherein said part of speech is a proper noun.

11. A system for generating synthetic speech comprising:
a speech recognition component capable of extracting at least one prosodic characteristic from speech input;
a prosodic characteristic store configured to store and permit retrieval of said at least one extracted prosodic characteristic and at least one pre-defined prosodic characteristic; and,
a text-to-speech component capable of modifying at least a portion of synthetically generated speech based upon at least one prosodic characteristic, wherein said at least one prosodic characteristic is selected from said at least one extracted prosodic characteristic and said at least one pre-defined prosodic characteristics, wherein said at least one pre-defined prosodic characteristic is selected if said at least one extracted prosodic characteristic matches at least one condition.

12. The system of claim 11, wherein said system is an interactive voice response system.

13. A machine readable storage having stored thereon, a computer program having a plurality of code sections, said code sections executable by a machine for causing the machine to perform the steps of:
storing at least one pre-defined prosodic characteristic;
receiving a speech input;
extracting at least one prosodic characteristic contained within said speech input;
selecting at least one prosodic characteristic for generating a speech output, wherein said at least one prosodic characteristic is selected from said at least one extracted prosodic characteristic and said at least one pre-defined prosodic characteristic, wherein said at least one pre-defined prosodic characteristic is selected if said at least one extracted prosodic characteristic matches at least one condition; and,
generating a speech output including said at least one selected prosodic characteristic within said speech output.

14. The machine readable storage of claim 13, wherein said speech output includes a portion of said speech input, wherein said portion of said speech output utilizes said at least one prosodic characteristic.

15. The machine readable storage of claim 13, further comprising the steps of:
upon completing said determining step, storing said prosodic characteristic into a data store; and,
before said generating step, retrieving said prosodic characteristic from said data store.

16. The machine readable storage of claim 13, wherein said receiving step occurs during a first session and wherein said generating step occurs during a second session, and wherein said first session and said second session represent two different interactive periods for a common user.

17. The machine readable storage of claim 13, wherein at least one prosodic characteristic is selected from the group consisting of the speed before and after a word, the pause before and after a word, the rhyme of words, the relative tones of a word, the relative stresses applied to a word, the relative stresses applied to a syllable, and the relative stresses applied to a syllable combination.

18. The machine readable storage of claim 13, wherein said receiving step and said generating step are performed by an interactive voice response system.

19. The machine readable storage of claim 13, further comprising the steps of:
converting said speech input into an input text string; and,
performing a function responsive to said converting step.

20. The machine readable storage of claim 19, further comprising the steps of:
generating an output text string responsive to said performing step; and,
converting said output text string into said speech output.

21. The machine readable storage of claim 13, further comprising the steps of:
identifying a part of speech associated with at least one word within said speech input; and,
detecting said at least one prosodic characteristic for said selected part of speech.

22. The machine readable storage of claim 21, wherein said part of speech is a proper noun.

23. A method for synthetically generating speech comprising the steps of:
receiving a speech input;

analyzing said speech input to generate special handling instructions, said instructions comprising generating speech using at least one prosodic characteristic selected from said at least one extracted prosodic characteristic and said at least one pre-defined prosodic characteristic, wherein said at least one pre-defined prosodic characteristic is selected if said at least one extracted prosodic characteristic matches at least one condition; and, altering at least one speech generation characteristic of a text-to-speech application based upon said special handling instructions.

24. The method of claim 23, wherein said at least one condition is based upon at least one of a language proficiency level and an emotional state of the listener.

25. The method of claim 23, wherein said speech generation characteristic alters at least one of clarity and pace of speech output.

26. A machine readable storage having stored thereon, a computer program having a plurality of code sections, said code sections executable by a machine for causing the machine to perform the steps of:

receiving a speech input;

analyzing said speech input to generate special handling instructions, said instructions comprising generating speech using at least one prosodic characteristic selected from said at least one extracted prosodic characteristic and said at least one pre-defined prosodic characteristic, wherein said at least one pre-defined prosodic characteristic is selected if said at least one extracted prosodic characteristic matches at least one condition; and, altering at least one speech generation characteristic of a text-to-speech application based upon said special handling instructions.

27. The machine readable storage of claim 26, wherein wherein said at least one condition is based upon at least one of a language proficiency level and an emotional state of the listener.

28. The machine readable storage of claim 26, wherein said speech generation characteristic alters at least one of clarity and pace of speech output.

* * * * *